(12) United States Patent
Kato et al.

(10) Patent No.: US 12,097,810 B2
(45) Date of Patent: Sep. 24, 2024

(54) WIRING HARNESS UNIT AND WIRING HARNESS MOUNTING STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hirotaka Kato, Mie (JP); Satoshi Yamamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 274 days.

(21) Appl. No.: 17/434,871

(22) PCT Filed: Dec. 12, 2019

(86) PCT No.: PCT/JP2019/048687
§ 371 (c)(1),
(2) Date: Aug. 30, 2021

(87) PCT Pub. No.: WO2020/179177
PCT Pub. Date: Sep. 10, 2020

(65) Prior Publication Data
US 2022/0169190 A1    Jun. 2, 2022

(30) Foreign Application Priority Data

Mar. 5, 2019  (JP) .................................. 2019-039789

(51) Int. Cl.
*B60R 16/02*   (2006.01)
*H02G 3/30*    (2006.01)

(52) U.S. Cl.
CPC ........... *B60R 16/0215* (2013.01); *H02G 3/30* (2013.01)

(58) Field of Classification Search
CPC .. B60R 16/0207; B60R 16/0215; H02G 3/30; H02G 3/32; H01B 7/0045;
(Continued)

(56) References Cited

U.S. PATENT DOCUMENTS 3,820,055 A * 6/1974 Huffnagle ............ H01R 12/675
                                                      439/752
4,768,287 A * 9/1988 Thies ................... H01R 12/675
                                                      174/84 C (Continued)

FOREIGN PATENT DOCUMENTS

JP    H0636140 U  *  5/1994  ............... H01B 7/08
JP    2007-104828 A    4/2007
(Continued)

OTHER PUBLICATIONS

International Search Report issued on Feb. 10, 2020 for WO 2020/179177 A1 (4 pages).

*Primary Examiner* — Paresh Paghadal
(74) *Attorney, Agent, or Firm* — Venjuris, P.C.

(57) ABSTRACT

A technique disclosed by this specification relates to a wiring harness unit 10 to be attached to an case 60 and including a wiring harness 30 having a plurality of coated wires 11 fixed to sheet-like base members 20 and a protector 40 including a pair of sandwiching portions for sandwiching and holding a margin portion 34 different from a part fixed to the plurality of coated wires 11 in the base members 20 and a fitting portion to be fit to a fit portion provided on the (Continued)

case 60 in a lateral direction and locked to the fit portion in a front-back direction.

4 Claims, 20 Drawing Sheets

(58) Field of Classification Search
CPC ........ H01B 13/01254; H01B 13/01263; H01B 7/04; H01B 7/08; H01B 7/0838; H01B 7/0846; H01B 7/203; F16B 2/10
See application file for complete search history.

(56) References Cited

U.S. PATENT DOCUMENTS

| | | | | |
|---|---|---|---|---|
| 5,111,362 A | * | 5/1992 | Flamm | H05K 5/0008 361/752 |
| 6,732,983 B1 | * | 5/2004 | Blake | F16L 3/1236 248/74.2 |
| 7,551,448 B2 | * | 6/2009 | Roberts | H05K 3/365 361/800 |
| 10,797,477 B1 | * | 10/2020 | Peterson | H02G 3/32 |
| 2002/0092666 A1 | * | 7/2002 | Hasegawa | H01R 12/772 174/92 |
| 2007/0066101 A1 | * | 3/2007 | Suzuki | B60R 16/0215 439/99 |
| 2007/0066125 A1 | * | 3/2007 | Uenver | H01R 13/73 439/459 |

FOREIGN PATENT DOCUMENTS

| | | |
|---|---|---|
| JP | 2009-027770 A | 2/2009 |
| JP | 2009-154653 A | 7/2009 |
| JP | 2012-051494 A | 3/2012 |
| JP | 2015-186284 A | 10/2015 |

* cited by examiner

WIRING HARNESS UNIT AND WIRING HARNESS MOUNTING STRUCTURE

CROSS REFERENCE TO RELATED APPLICATIONS

This application is a national phase of PCT application No. PCT/JP2019/048687, filed on 12 Dec. 2019, which claims priority from Japanese patent application No. 2019-039789, filed on 5 Mar. 2019, all of which are incorporated herein by reference.

TECHNICAL FIELD

A technique disclosed by this specification relates to a wiring harness unit and a wiring harness mounting structure.

BACKGROUND

A wiring harness mounting structure for mounting a wiring harness having a main line part formed by bundling a plurality of wires on a seat is known, for example, from Japanese Patent Laid-open Publication No. 2012-051494 (Patent Document 1 below).

A binding band to be wound on the outer periphery of the main line part is mounted on the main line part of the wiring harness. A locking portion is formed to be continuous with the binding band, and the wiring harness is mounted on the lower surface of the seat by locking the locking portion and an edge part of a slit provided in the lower surface of the seat.

PRIOR ART DOCUMENT

Patent Document

Patent Document 1: JP 2012-051494 A

SUMMARY OF THE INVENTION

Problems to be Solved

If the binding band is wound on the outer periphery of the wiring harness as described above, there is a concern that the binding band bites into the wires of the wiring harness to damage the wires, for example, if the wiring harness is strongly pulled.

A technique for suppressing the damage of wires of a wiring harness by another member is disclosed in this specification.

Means to Solve the Problem

The technique disclosed by this specification is directed to a wiring harness unit to be attached to an attached member, the wiring harness unit including a wiring harness having at least one wire fixed to a sheet-like base member, and a protector including a pair of sandwiching portions for sandwiching and holding a margin portion different from a part fixed to the wire in the base member and a fitting portion to be fit to a fit portion provided on the attached member in a direction intersecting an extending direction of the wire and locked to the fit portion in the extending direction of the wire.

According to the wiring harness unit thus configured, the margin portion different from the part fixed to the wire is sandwiched and held by the pair of sandwiching portions. Further, the wiring harness unit is attached to the attached member by fitting the fitting portion to the fit portion of the attached member. Thus, a pulling force acts on the base member of the wiring harness, for example, if the wiring harness is strongly pulled. That is, since another member does not bite into the wire, the damage of the wire by the other member can be prevented.

The wiring harness unit disclosed by this specification may be configured as follows.

The pair of sandwiching portions may include a plurality of protrusions projecting toward the margin portion, the plurality of protrusions in one of the pair of sandwiching portions and the plurality of protrusions in the other of the pair of sandwiching portions may be alternately arranged, and the margin portion may be arranged to meander between the plurality of protrusions alternately arranged.

According to this configuration, since the margin portion is arranged to meander between the plurality of protrusions in the pair of sandwiching portions, the protrusions bite into the base member and the detachment of the wiring harness from the protector can be suppressed if the wiring harness is pulled. Further, a holding force for the wiring harness in the protector can be enhanced.

The protector may further include a pair of wall bodies connected to the pair of sandwiching portions and arranged along the wiring harness, a hinge for linking the pair of wall bodies to each other may be provided on one-end sides of the pair of wall bodies, and a lock mechanism for holding the margin portion in a state sandwiched by the pair of sandwiching portions may be provided over the pair of wall bodies on other-end sides of the pair of wall bodies.

According to this configuration, since the margin portion is held in the state sandwiched by the pair of sandwiching portions by the lock mechanism, inadvertent detachment of the protector from the wiring harness can be suppressed.

The technique disclosed by this specification is also directed to a wiring harness mounting structure with the above wiring harness unit and the attached member to be attached with the wiring harness unit, wherein the fitting portions are formed to project from a pair of wall bodies, the attached member includes an accommodating portion for accommodating the protector with the margin portion sandwiched by the pair of sandwiching portions, and the fit portions recessed in correspondence with a projection dimension of the fitting portions are formed in an inner wall of the accommodating portion.

According to this configuration, the protector can be mounted on the attached member by accommodating the protector of the wiring harness unit into the accommodating portion to fit the fit portions and the fitting portions. Further, since the margin portion is held sandwiched by the pair of sandwiching portions by accommodating the protector into the accommodating portion, the disengagement of the margin portion from the pair of sandwiching portions can be further suppressed.

The protector may further include a retaining portion to be locked to a retained portion in a separating direction of the protector from the accommodating portion by being fit to the retained portion provided on the accommodating portion in a concave-convex manner in a direction intersecting the extending direction of the wire.

Further, the retaining portions may be formed to further project from projecting end parts of the fitting portions, and the retained portions may be formed by further recessing inner surfaces of the fit portions.

According to this configuration, the detachment of the pair of wall bodies from the accommodating portion can be prevented by locking the retaining portions and the retained portions. In this way, the detachment of the wiring harness unit from the attached member can be suppressed.

Effect of the Invention

According to the technique disclosed by this specification, it is possible to suppress the damage of wires of a wiring harness by another member.

DETAILED DESCRIPTION TO EXECUTE THE INVENTION

Embodiment

One embodiment of the technique disclosed in this specification is described with reference to FIGS. 1 to 17.

A mounting structure S for a wiring harness 30 in which a wiring harness unit 10 for connecting unillustrated devices installed in a vehicle to each other is attached to a case 60 of a device is illustrated in this embodiment. Note that, in the following description, an F side is a front side, a B side is a back side, an L side is a left side, an R side is a right side, a U side is an upper side and a D side is a lower side.

The wiring harness unit 10 includes the wiring harness 30 having a plurality of wires and a protector 40 to be assembled with the wiring harness 30.

Figure 2:
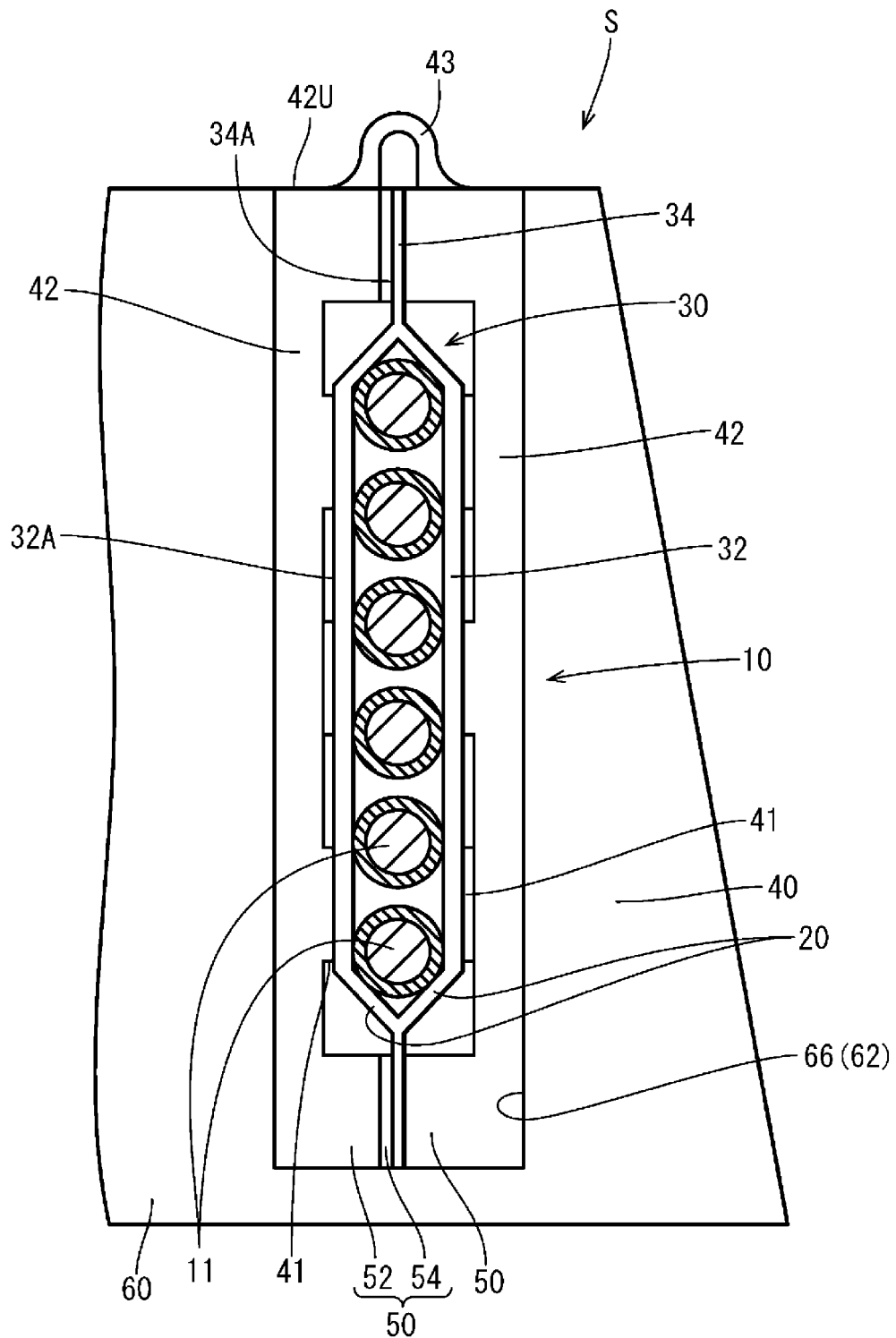
FIG. 2 is a front view showing the state where the wiring harness unit is attached to the protector accommodating portion of the case.
Figure 8:
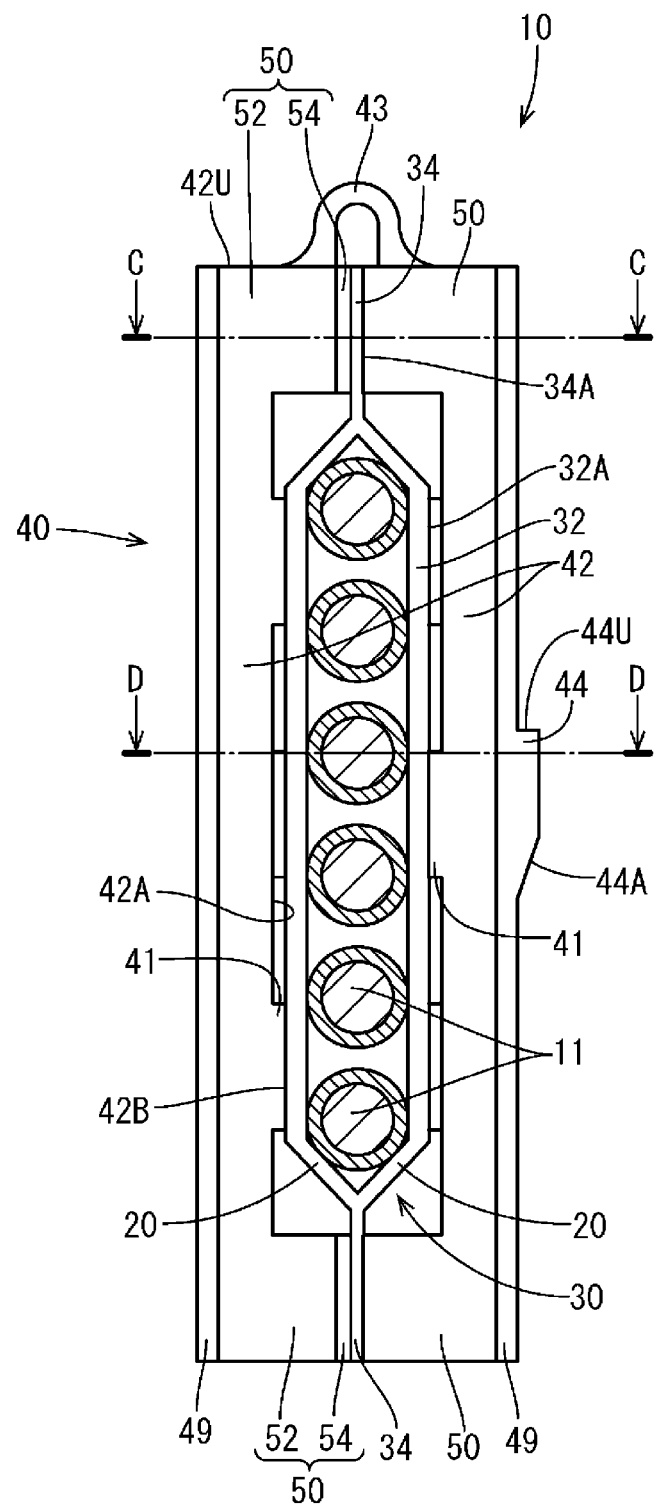
FIG. 8 is a front view of the wiring harness unit.

As shown in FIGS. 2 and 8, the wiring harness 30 includes a plurality of coated wires 11 and a pair of base members 20 for sandwiching and fixing the plurality of coated wires 11 from both sides. The wiring harness 30 in this embodiment is configured such that six coated wires 11 are sandwiched from both sides by the pair of base members 20.

Each coated wire 11 is formed by covering a core with an insulation coating.

The pair of base members 20 are formed into strips long in a front-back direction by a sheet-like nonwoven fabric. The nonwoven fabric is a fabric formed by entangling or bonding fibers and is, for example, a fiber sheet, a web (thin membrane-like sheet made of only fibers) or a bat (blanket-like fibers). In this embodiment, the base member 20 is made of a fiber sheet. Further, the base member 20 may be a woven fabric produced by weaving natural fibers or synthetic fibers.

The six coated wires 11 are fixed flatly side by side in a vertical direction in vertically central parts of the base members 20 as shown in FIGS. 2 and 8.

A part of the wiring harness 30 in which the six coated wires 11 are sandwiched and fixed by the pair of base members 20 serves as a wire fixing portion 32, and both vertical sides of the wire fixing portion 32 serve as margin portions 34 in which the base members 20 are fixed to each other.

The coated wires 11 are fixed to the base members 20 by a known fixing method such as the bonding of the coated wires 11 to the base members 20 by ultrasonic welding or heat welding, the fixing of the coated wires 11 to the base members 20 by an adhesive or glue or the sewing of the coated wires 11 to the base members 20. The base members 20 are fixed to each other by a known fixing method such as the bonding of the base members 20 to each other by ultrasonic welding or heat welding or the fixing of the base members 20 to each other by an adhesive or glue.

Figure 7:
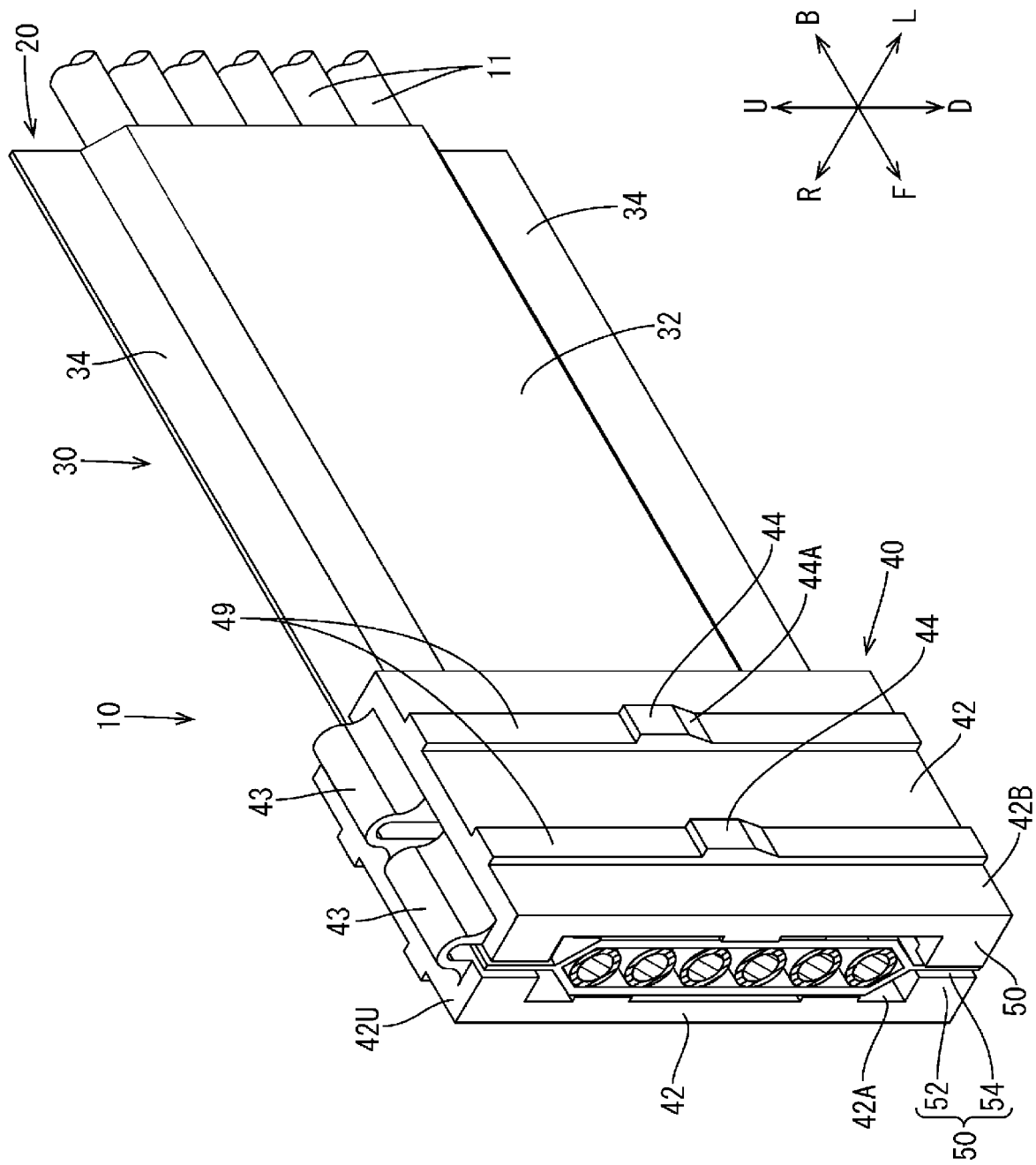
FIG. 7 is a perspective view of the wiring harness unit.
Figure 9:
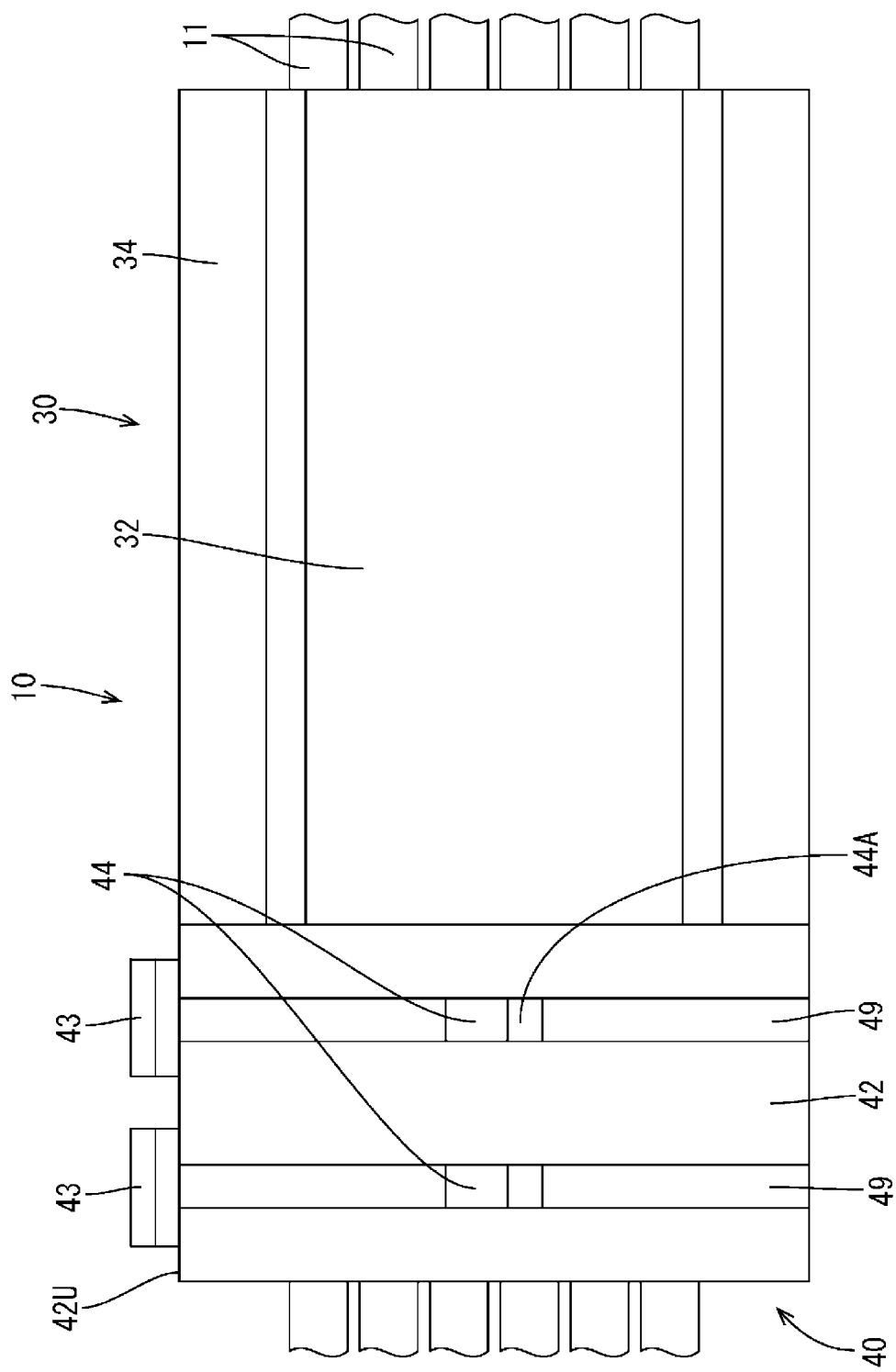
FIG. 9 is a side view of the wiring harness unit.
Figure 10:
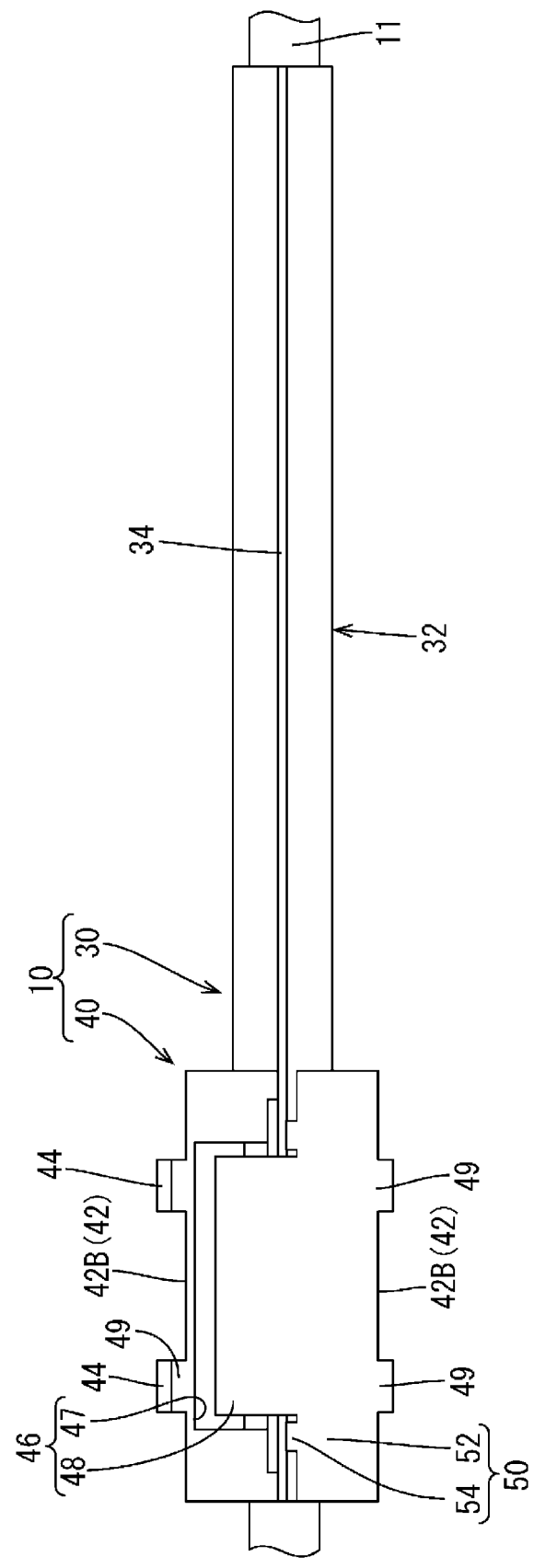
FIG. 10 is a bottom view of the wiring harness unit.

As shown in FIGS. 7 and 9, the plurality of coated wires 11 are pulled out from the pair of base members 20 in both end parts of the wiring harness 30. The plurality of coated wires 11 pulled out from the pair of base members 20 are connected to unillustrated various electrical components installed in the vehicle.

The protector 40 is formed of synthetic resin. As shown in FIGS. 7 and 9 to 12, the protector 40 is mounted on a front end part of the wire fixing portion 32 of the wiring harness 30. Accordingly, in the wiring harness unit 10, the wire fixing portion 32 of the wiring harness 30 is pulled out backward from a back end part of the protector 40, and the plurality of coated wires 11 are pulled out from a front end part of the protector 40.

Figure 5:
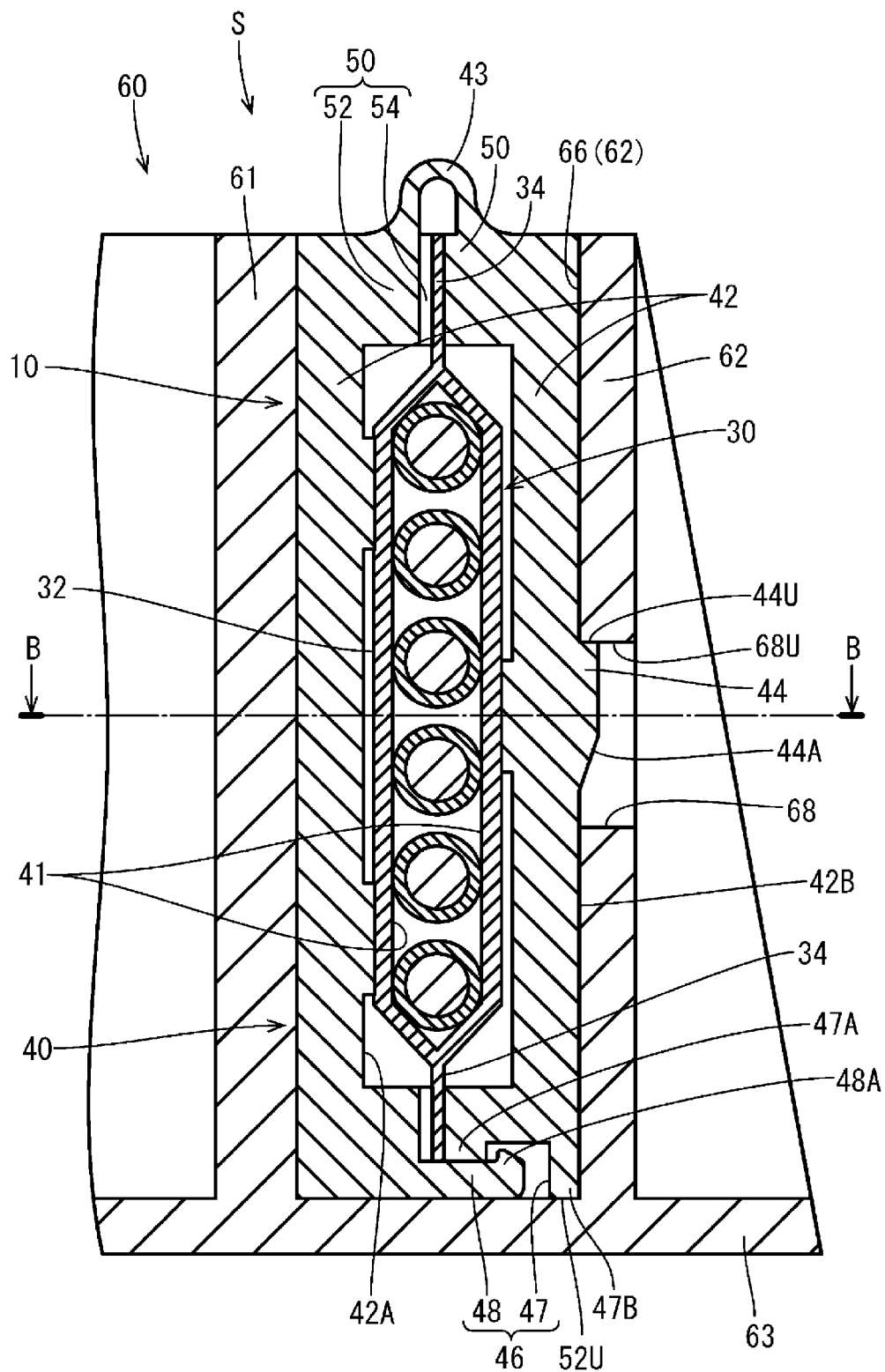
FIG. 5 is a section along A-A of FIG. 3.

As shown in FIG. 5, the protector 40 includes a pair of wall bodies 42 disposed along both lateral sides of the wiring harness 30, a pair of hinges 43 for linking the pair of wall bodies 42 to each other, a lock mechanism 46 provided over the pair of wall bodies 42, and two pairs of sandwiching portions 50 for sandwiching the wiring harness 30 from both lateral sides.

As shown in FIGS. 7 and 9, each of the pair of wall bodies 42 is in the form of a substantially rectangular flat plate. The pair of hinges 43 for linking the pair of wall bodies 42 to each other are formed side by side in the front-back direction on upper end parts 42U, which are one-end parts of the pair of wall bodies 42. The pair of hinges 43 are formed to be thinner than the wall bodies 42 so as to be bendable.

Before the protector 40 is assembled with the wiring harness 30, the pair of wall bodies 42 are in such a state that the pair of hinges 43 extend straight and an inner surface 42A of each wall body 42 on the side of the wiring harness 30 faces downward as shown in FIGS. 13 and 15 to 17. Further, when the protector 40 is assembled with the wiring harness 30, the pair of wall bodies 42 are arranged along both lateral sides of the wiring harness 30 by the pair of hinges 43 being folded in half and bent as shown in FIGS. 1 to 5 and 7 to 9.

As shown in FIGS. 7 and 8, a plurality of support protrusions 41 in contact with the wire fixing portion 32 of the wiring harness 30 are formed on the inner side surfaces 42A of the pair of wall bodies 42.

Figure 15:
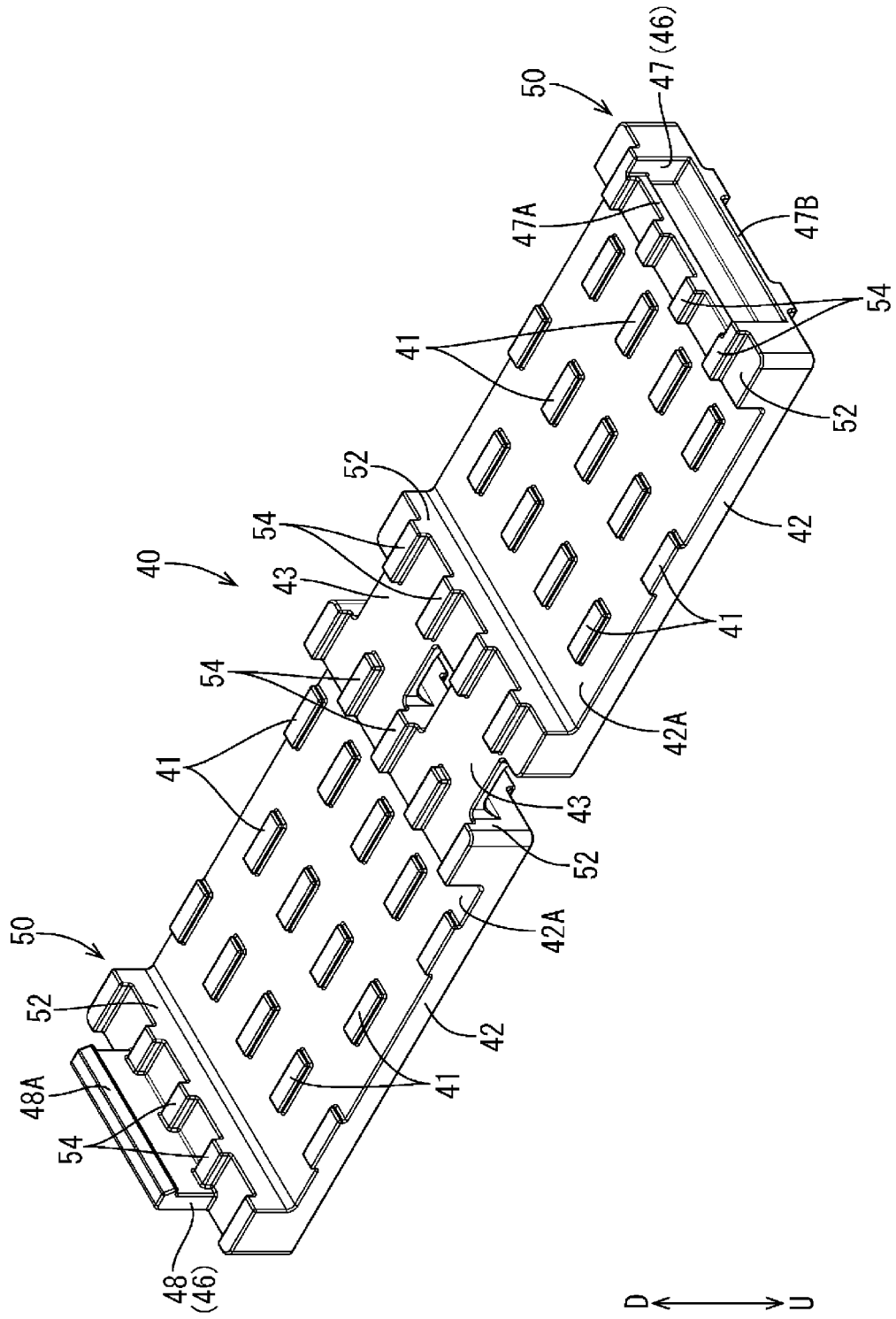
FIG. 15 is a perspective view of the protector.
Figure 16:
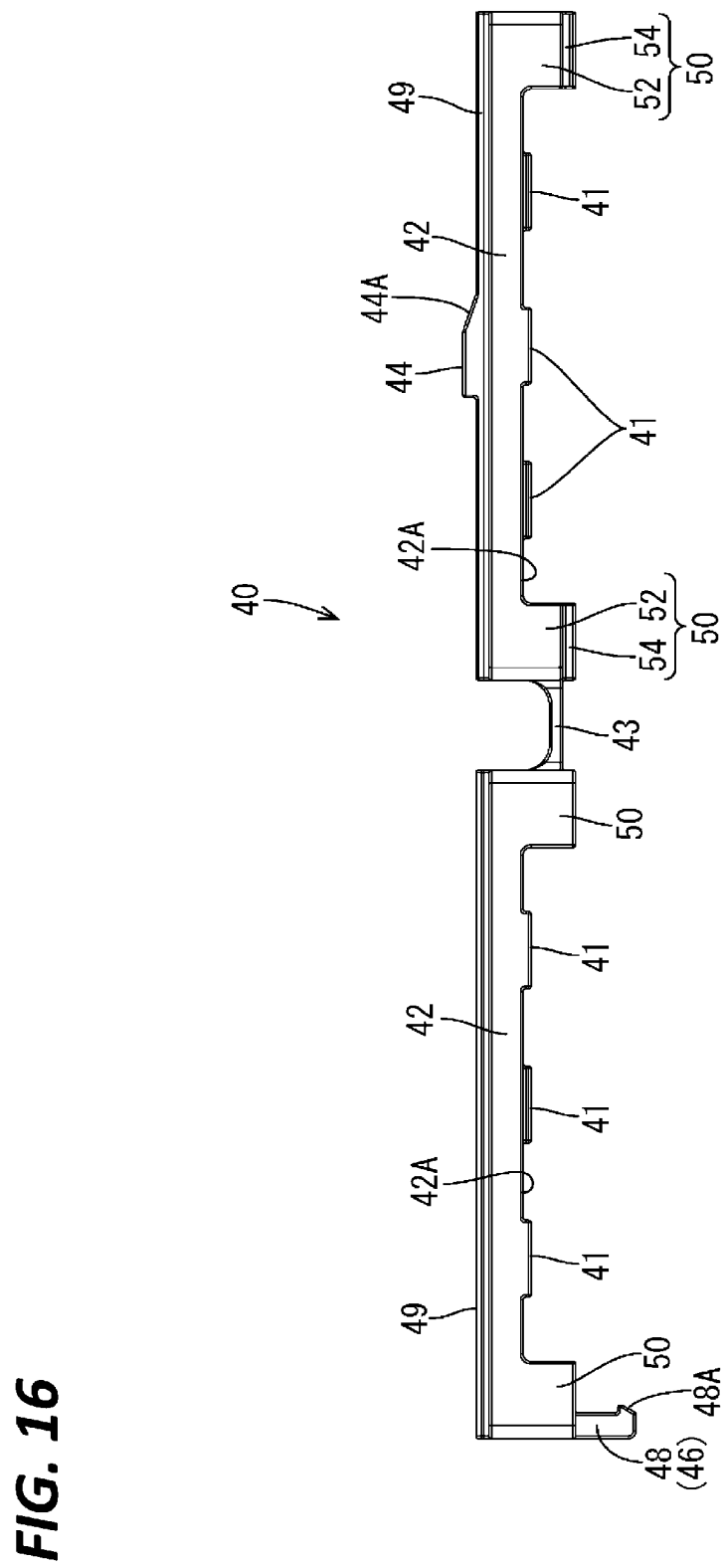
FIG. 16 is a front view of the protector.
Figure 17:
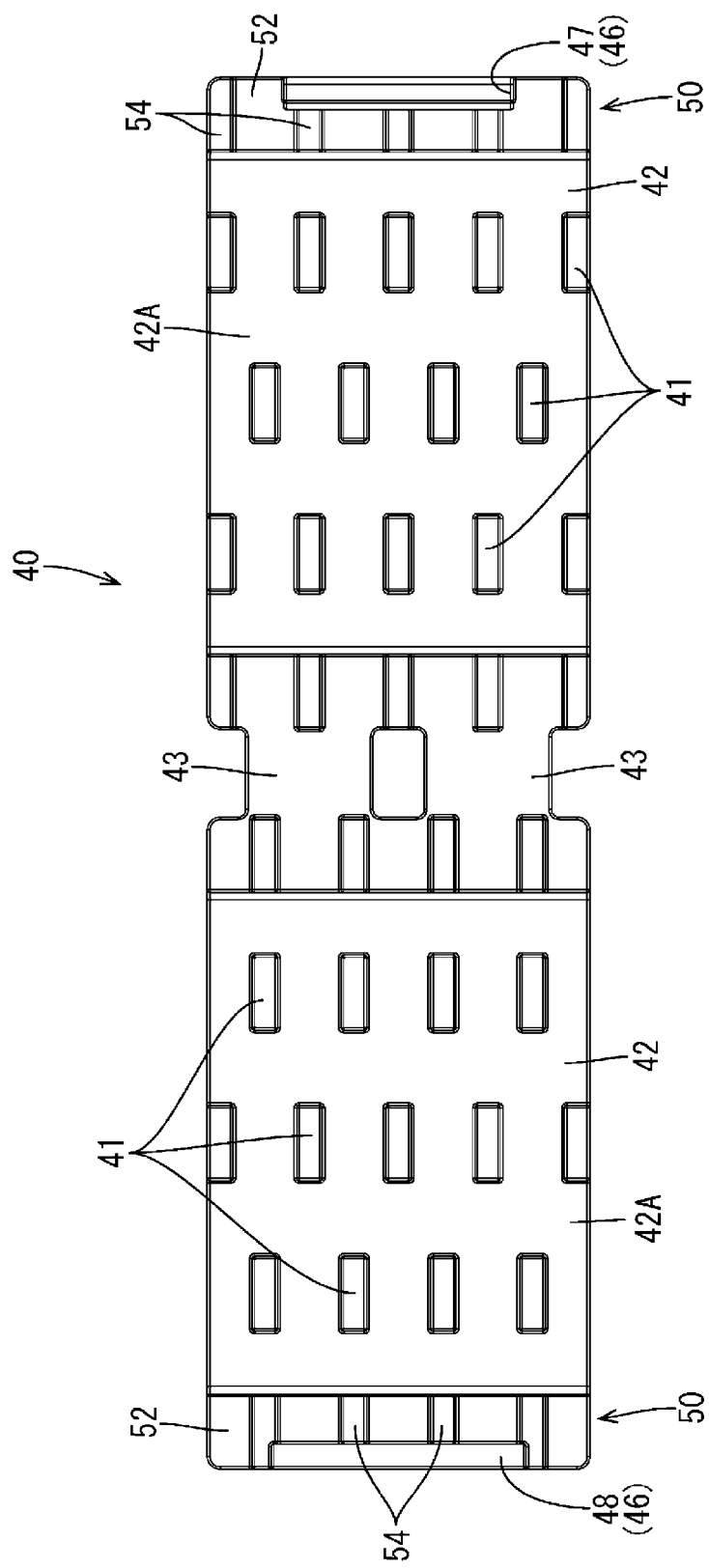
FIG. 17 is a bottom view of the protector.

As shown in FIGS. 15 and 17, the plurality of support protrusions 41 are formed side by side at intervals in the front-back direction in three rows separated in the lateral direction. The support protrusions 41 are so arranged in the lateral direction in three rows that the support protrusions 41 in adjacent rows are shifted in the front-back direction. That is, the plurality of support protrusions 41 are formed in a staggered manner in the front-back and lateral directions on the inner side surface 42A of the wall body 42.

Figure 6:
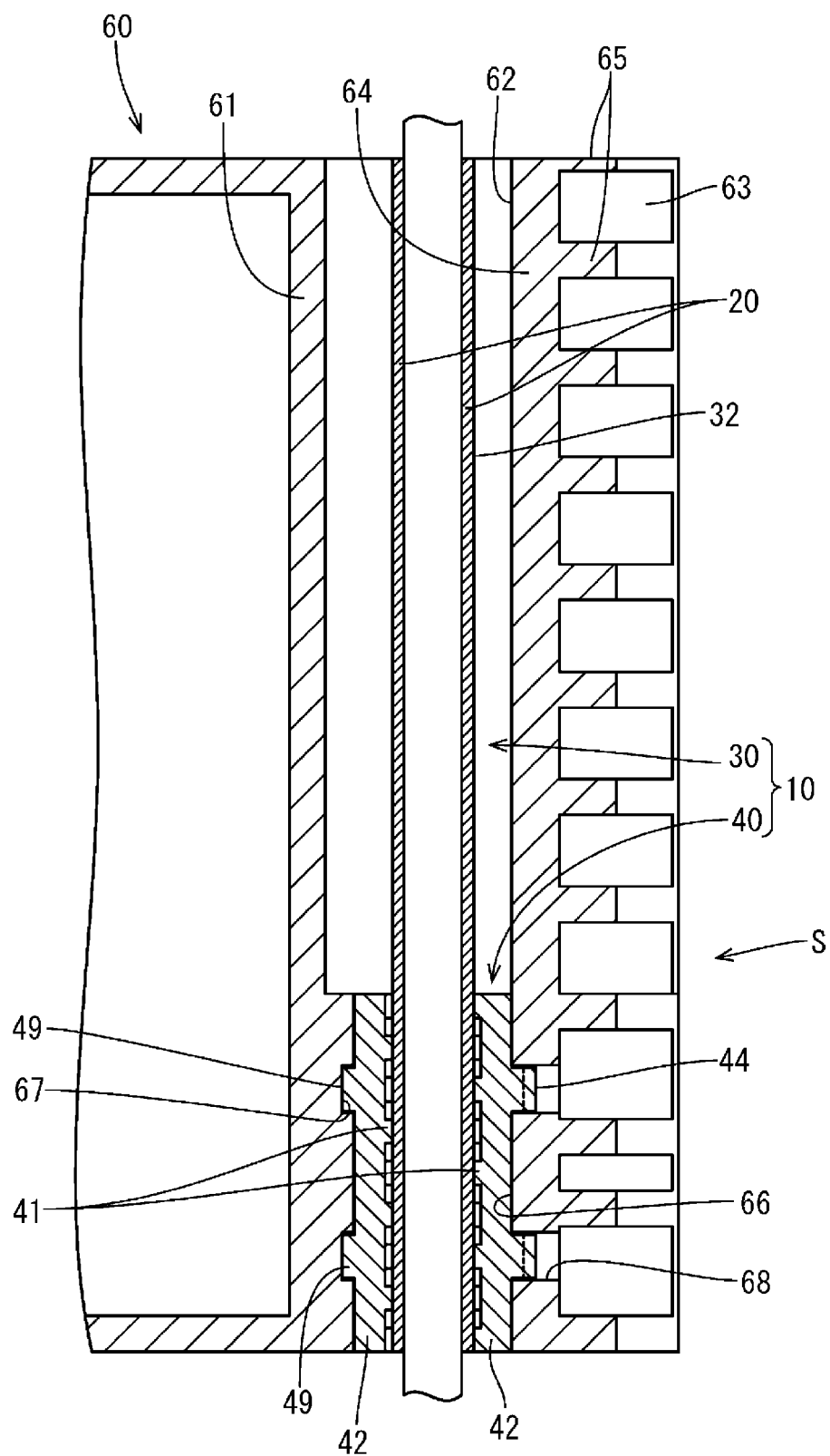
FIG. 6 is a section along B-B of FIG. 5.
Figure 12:
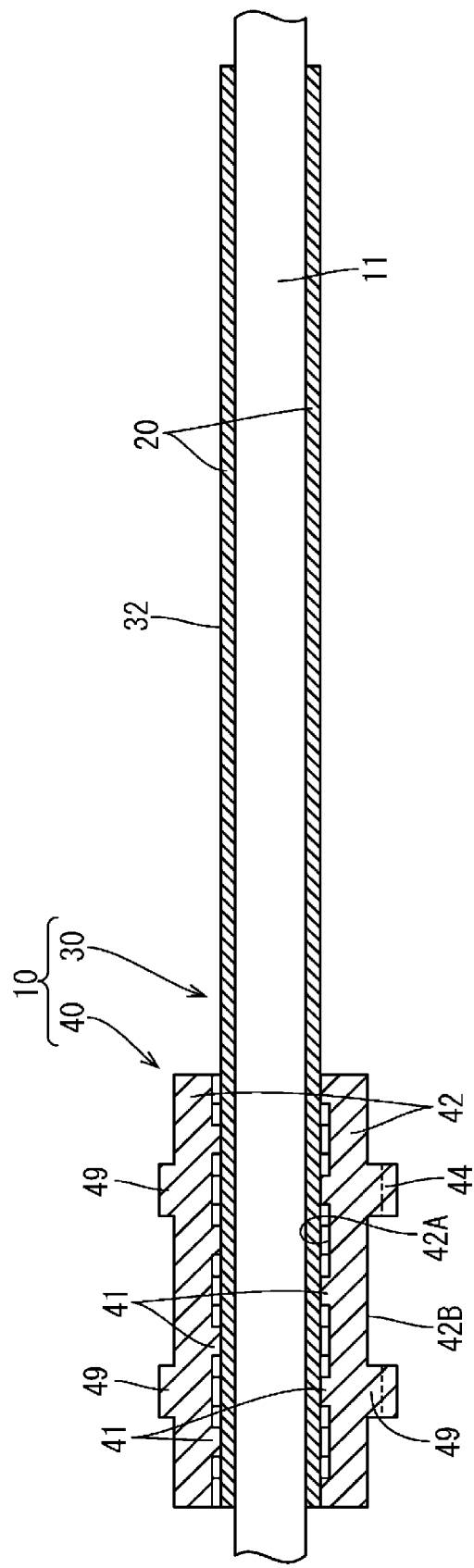
FIG. 12 is a section along D-D of FIG. 8.
Figure 13:
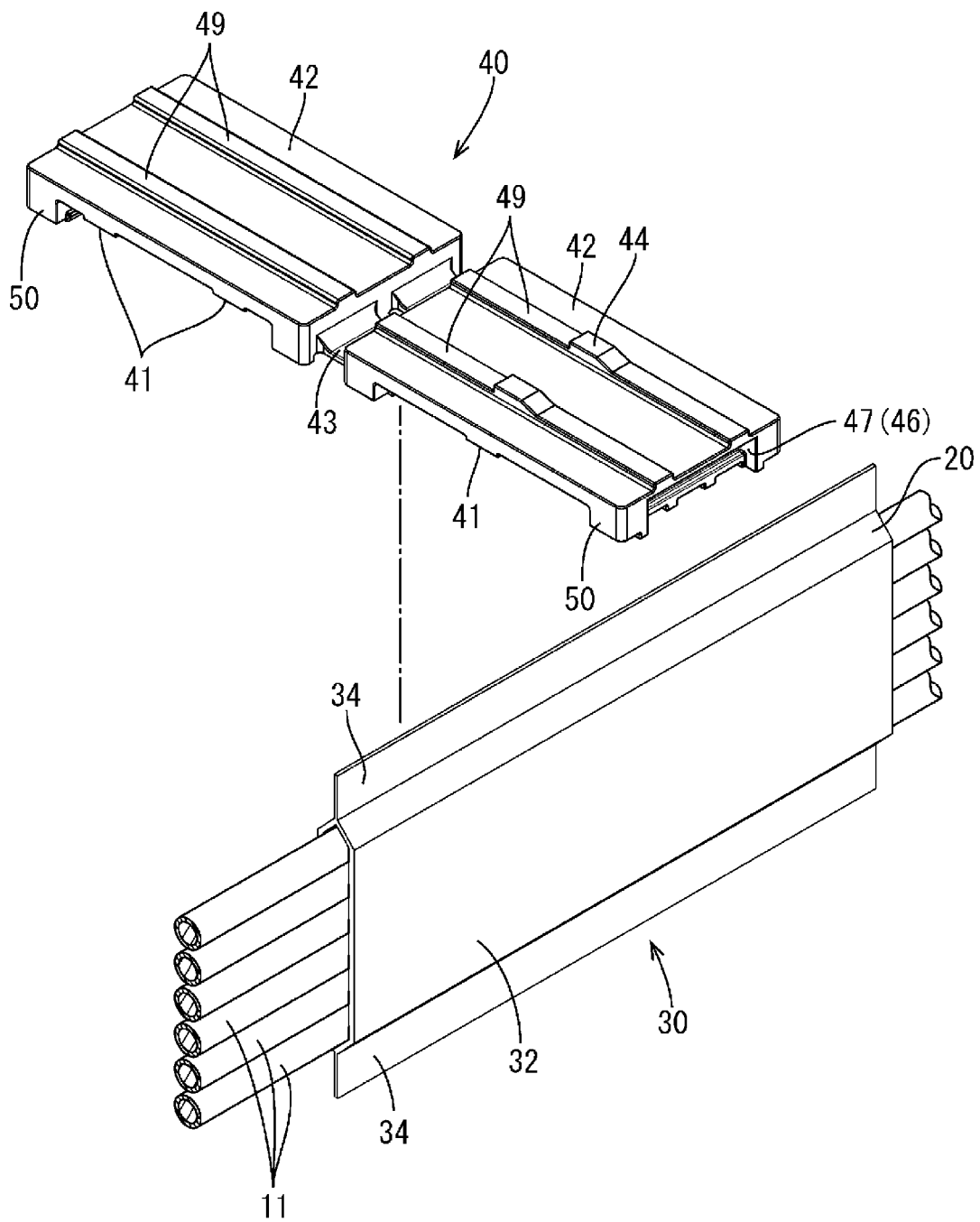
FIG. 13 is a perspective view showing a state before a protector is assembled with a wiring harness.

Further, the support protrusions 41 on the pair of wall bodies 42 are alternately arranged in the front-back and lateral directions on the pair of wall bodies 42 as shown in FIGS. 15 and 17. Thus, when the protector 40 is assembled with the wiring harness 30, the plurality of support protrusions 41 on the pair of wall bodies 42 alternately contact the wire fixing portion 32 in the front-back direction from both lateral sides and support the wire fixing portion 32 from both lateral sides as shown in FIGS. 6 and 12.

As shown in FIGS. 2, 5 and 8, a pair of sandwiching portions 50 are formed on each of upper and lower end edge parts on the inner side surfaces 42A of the pair of wall bodies 42. Each sandwiching portion 50 includes a thick portion 52 projecting from the wall body 42 toward the margin portion 34 of the wiring harness 30 and a plurality of protrusions 54 further projecting from the thick portion 52 toward the margin portion 34.

The thick portion 52 is formed over the entire length of the wall body 42 in the front-back direction. A projection dimension of the thick portion 52 from the wall body 42 is set to be substantially equal to a distance between an outer surface 32A of the wire fixing portion 32 and outer surfaces 34A of the margin portions 34.

As shown in FIGS. 15 and 17, the plurality of protrusions 54 are formed side by side in a row at intervals in the front-back direction. The plurality of protrusions 54 are also alternately arranged in the front-back and lateral directions on the pair of wall bodies 42, similarly to the support protrusions 41. A projection dimension of the protrusions 54 from the thick portion 52 is set to be slightly larger than that of the support protrusions 41.

Figure 11:
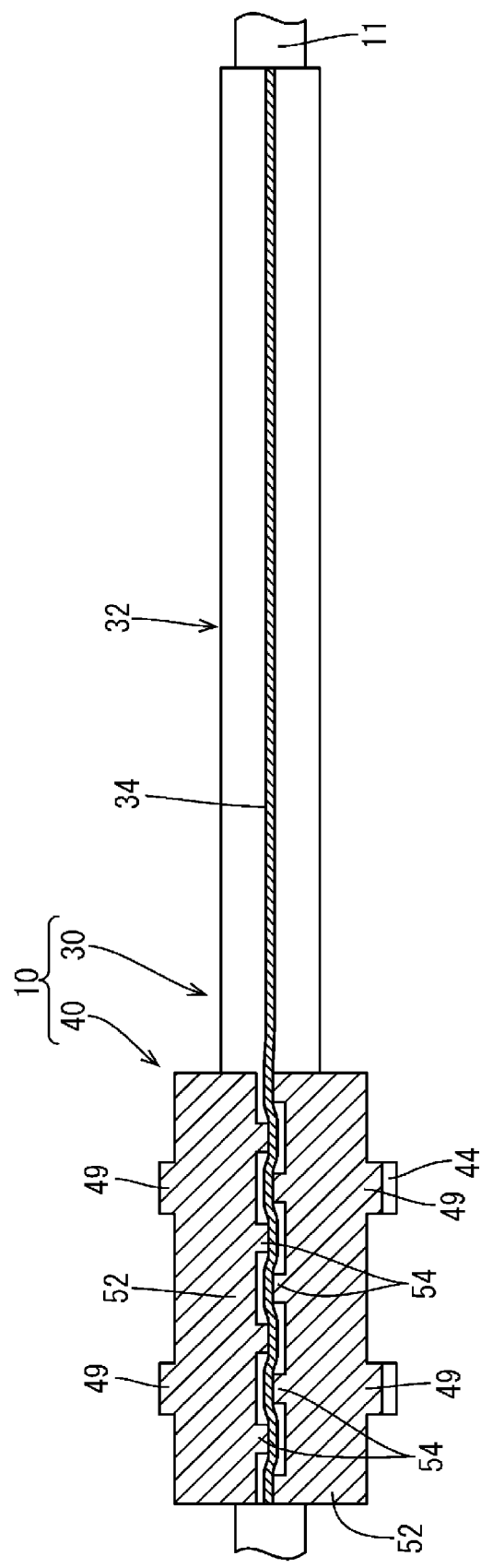
FIG. 11 is a section along C-C of FIG. 8.

Accordingly, when the protector 40 is assembled with the wiring harness 30, the plurality of protrusions 54 on the pair of wall bodies 42 press the margin portions 34 alternately in the front-back direction from both sides in the lateral direction, and the margin portion 34 is arranged to meander in the lateral direction between the pair of sandwiching portions 50 as shown in FIG. 11.

As shown in FIG. 5, the lock mechanism 46 is formed on the pair of sandwiching portions 50 on lower end sides, which are other-end sides, of the pair of wall bodies 42.

The lock mechanism 46 includes a lock receiving portion 47 formed on the thick portion 52 of the right sandwiching portion 50, which is one sandwiching portion 50, and a lock piece 48 resiliently displaceably formed on the thick portion 52 of the left sandwiching portion 50, which is the other sandwiching portion 50.

The lock receiving portion 47 is recessed upwardly from a lower surface 52U of the thick portion 52. A vertical height of an inner edge part 47A of the lock receiving portion 47 on the side of the wiring harness 30 is smaller than that of an outer edge part 47B.

The lock piece 48 is cantilevered toward the wiring harness 30 from a substantially central part in the front-back direction of the lower end edge of the thick portion 52. A lock projection 48A projecting upward is formed on an extending end part of the lock piece 48.

The lock piece 48 is resiliently deformed downward by the lock projection 48A riding on the inner edge part 47A of the lock receiving portion 47 in assembling the protector 40 with the wiring harness 30. When the protector 40 is assembled with the wiring harness 30 and the pair of wall bodies 42 are arranged along the wiring harness 30, the lock projection 48A rides beyond the inner edge part 47A and the lock piece 48 resiliently returns. When the lock piece 48 resiliently returns, the lock projection 48A and the inner edge part 47A of the lock receiving portion 47 are locked in the lateral direction and the pair of wall bodies 42 are held in a state arranged along the wiring harness 30 as shown in FIG. 5.

Figure 3:
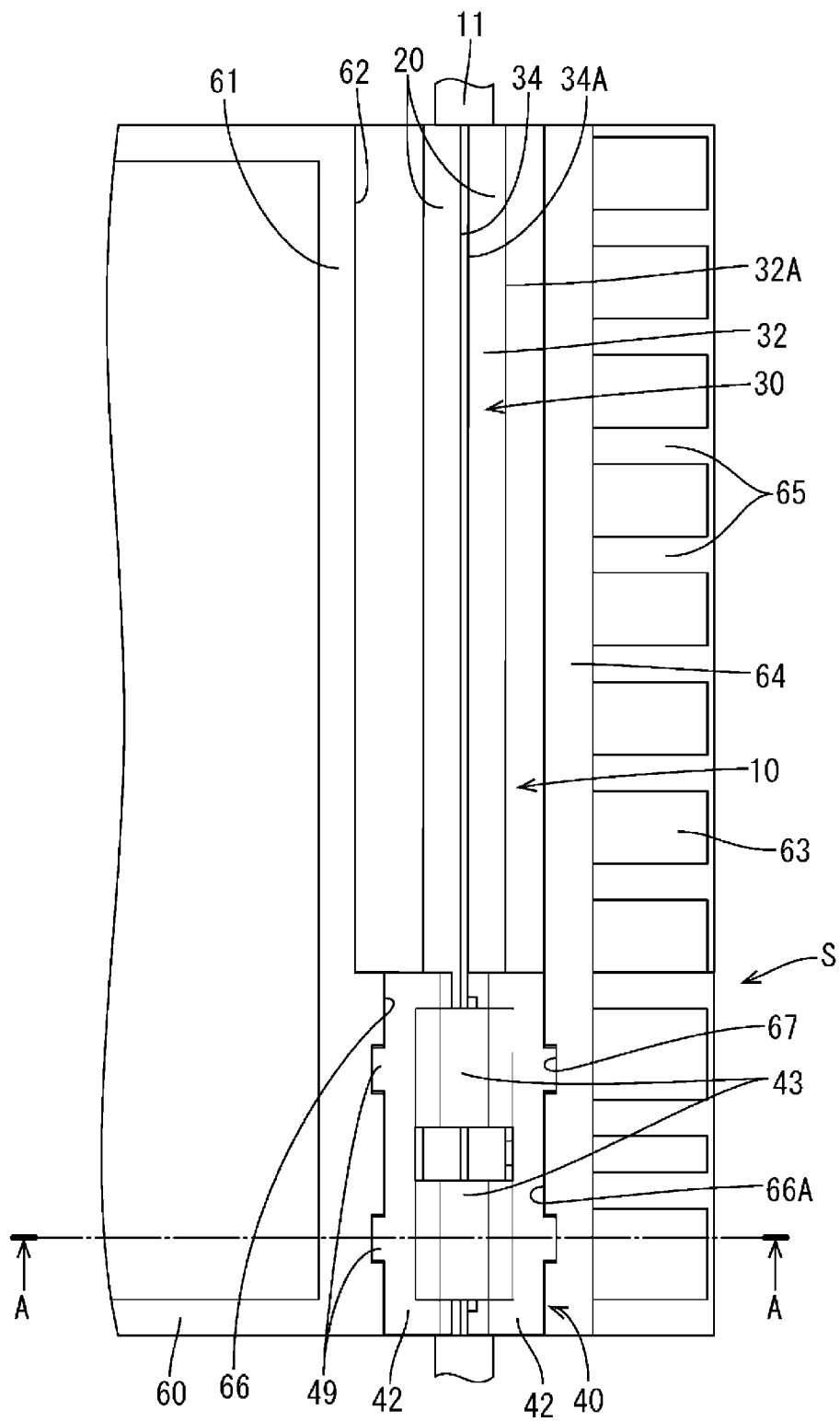
FIG. 3 is a plan view showing the state where the wiring harness unit is attached to the protector accommodating portion of the case.
Figure 4:
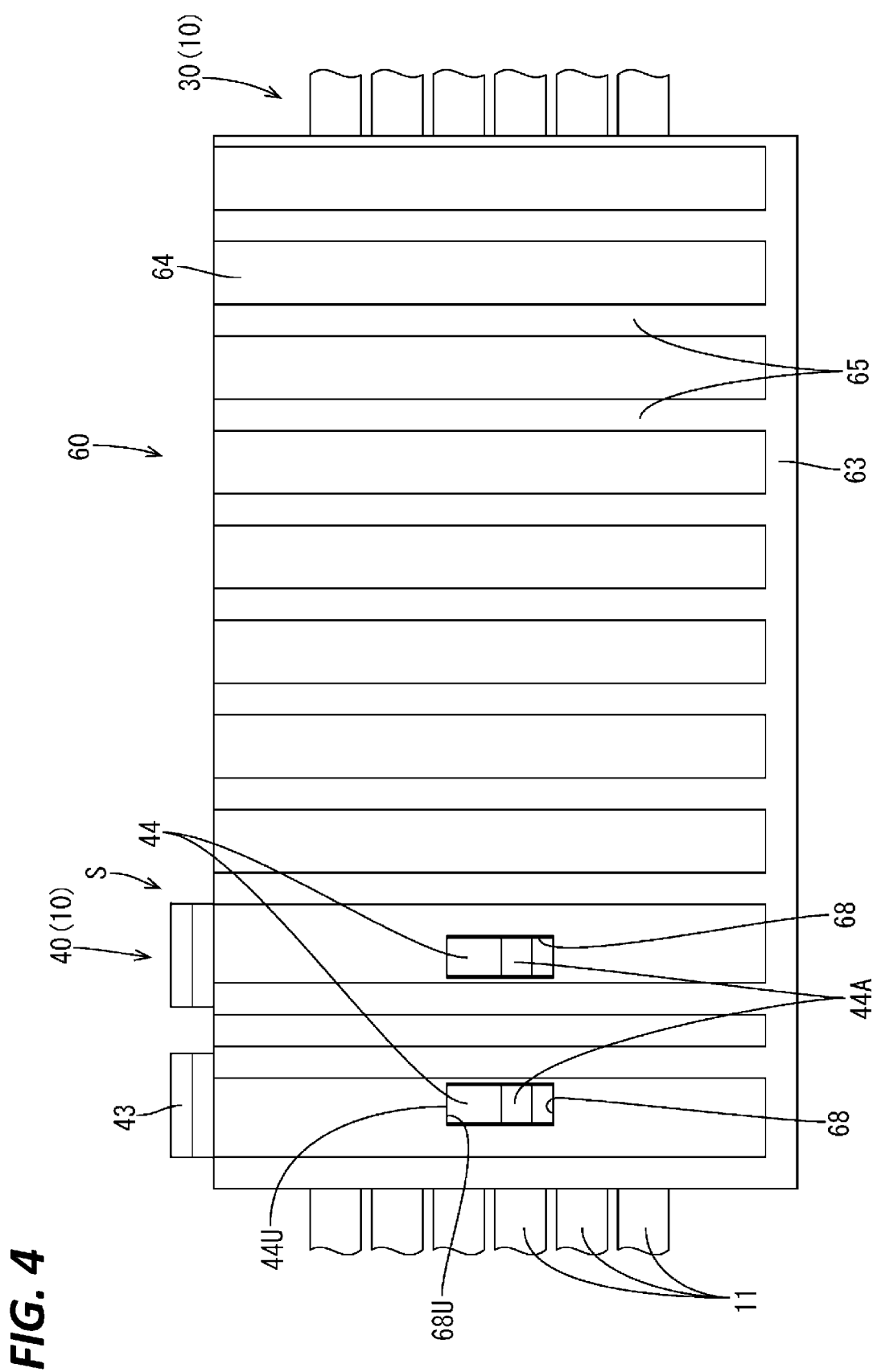
FIG. 4 is a side view showing the state where the wiring harness unit is attached to the protector accommodating portion of the case.

Further, as shown in FIGS. 3, 6 and 7, a plurality of fitting portions 49 projecting outward are formed on outer side surfaces 42B of the pair of wall bodies 42. In this embodiment, two fitting portions 49 are formed on each wall body 42 while being spaced apart in the front-back direction. Each fitting portion 49 is in the form of a rib extending along the entire length of the wall body 42 in the vertical direction and having a substantially rectangular shape in a plan view.

Further, a retaining portion 44 projecting further outward from the fitting portion 49 is formed on each fitting portion 49 on the left wall body 42.

As shown in FIG. 9, the retaining portion 44 is formed to have a substantially rectangular shape in a side view in a substantially vertically central part of the fitting portion 49. As shown in FIG. 8, a lower part of the retaining portion 44 is formed into a guiding surface 44A inclined to come closer to the fitting portion 49 toward a lower side.

The case 60 of the device is formed of synthetic resin. As shown in FIG. 3, the case 60 is formed into a box shape substantially rectangular in a plan view. A harness routing path 62 is formed on one side wall 61 of the case 60.

Figure 1:
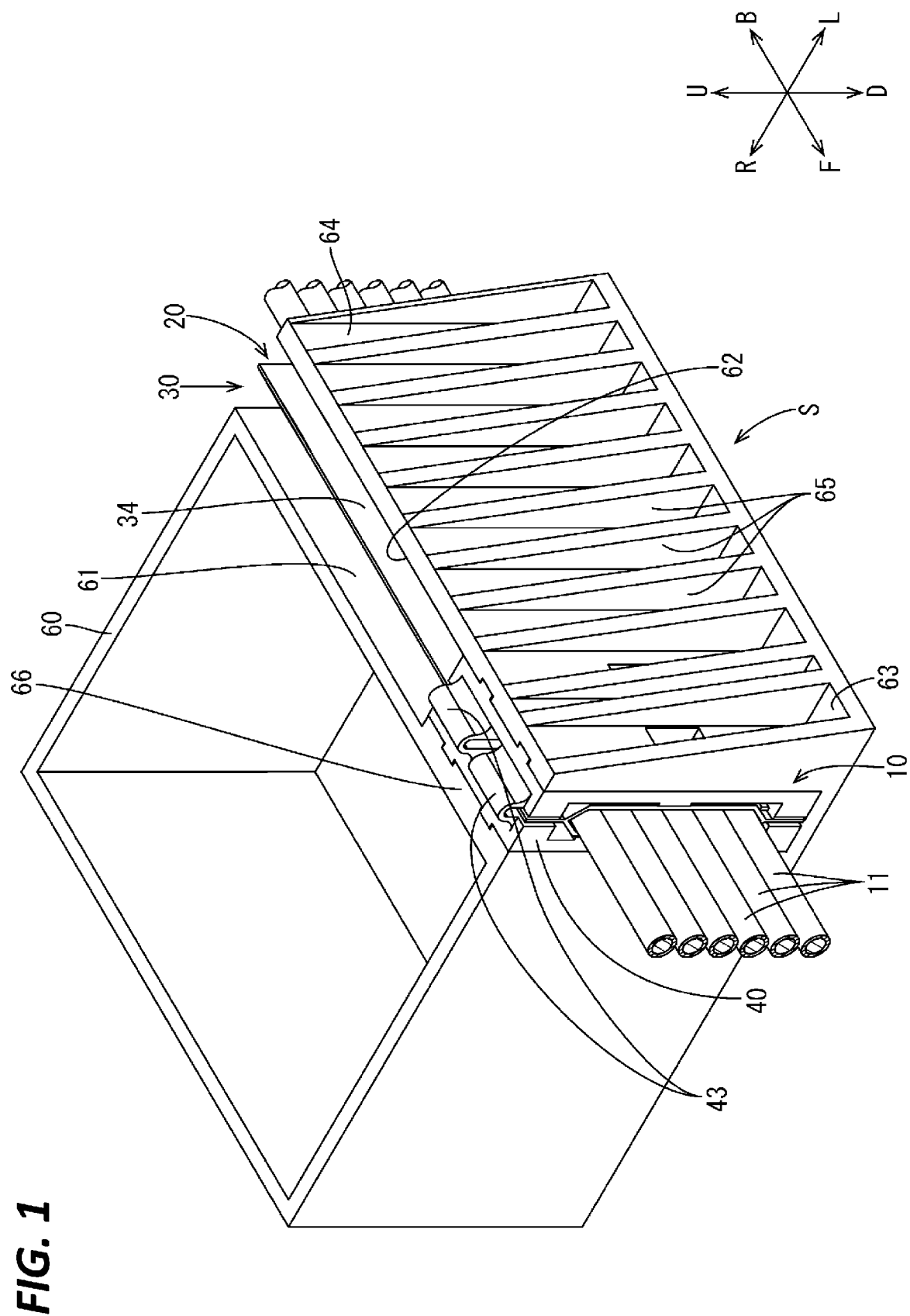
FIG. 1 is a perspective view of a wiring harness mounting structure according to a first embodiment showing a state where a wiring harness unit is attached to a protector accommodating portion of a case.
Figure 14:
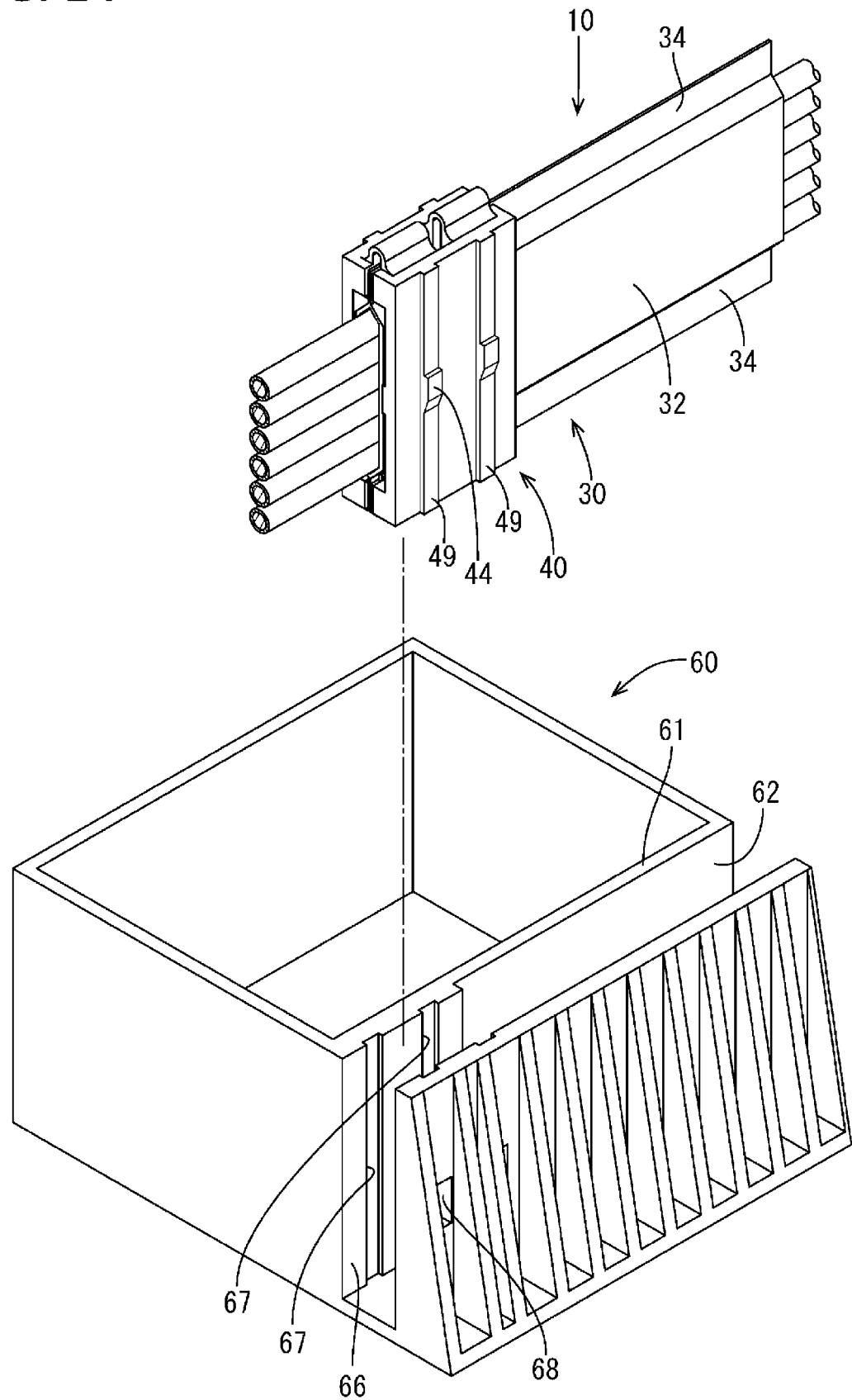
FIG. 14 is a perspective view showing a state before the wiring harness unit is attached to the protector accommodating portion of the case.

As shown in FIGS. 1, 3 and 14, the harness routing path 62 includes a bottom wall 63 in the form of a flat plate extending outward from the one side wall 61 of the case 60 and a standing wall 64 extending upward up to the same height as the one side wall 61 from the upper surface of the bottom wall 63.

A plurality of reinforcing portions 65 are formed on an outer surface 64A of the standing wall 64 opposite to the case 60. The plurality of reinforcing portions 65 are formed side by side while being spaced apart in the front-back direction. Each reinforcing portion 65 is in the form of a plate inclined more in a direction away from the standing wall 64 from the upper end of the standing wall 64 toward the bottom wall 63. Accordingly, an outward resilient displacement of the standing wall 64 from the case 60 can be suppressed.

As shown in FIGS. 1, 3 and 6, a protector accommodating portion 66 capable of accommodating the protector 40 of the wiring harness unit 10 is formed in a front end part of the harness routing path 62.

The protector accommodating portion 66 is formed by thickening a front end part of the one side wall 61 of the case 60.

The protector accommodating portion 66 is open forward, backward and upward and the protector 40 can be accommodated thereinto from above.

A length in the front-back direction of the protector accommodating portion 66 is substantially equal to that of the protector 40. Accordingly, when the protector 40 of the wiring harness unit 10 is accommodated into the protector accommodating portion 66, the wiring harness 30 pulled out backward from the protector 40 is routed in the harness routing path 62 and the plurality of coated wires 11 pulled out forward from the protector 40 are pulled out forward from the harness routing path 62.

A lateral width in the protector accommodating portion 66 is substantially equal to a width of the protector 40 as shown in FIGS. 2, 3, 5 and 6. Here, substantially equal means a case where the lateral width in the protector accommodating portion 66 and the width of the protector 40 are equal and a case where the lateral width in the protector accommodating portion 66 and the width of the protector 40 are not equal, but can be regarded as being substantially equal.

Accordingly, when the protector 40 is accommodated into the protector accommodating portion 66 from above, the pair of wall bodies 42 held by the lock mechanism 46 are doubly held in the protector accommodating portion 66.

A plurality of fit portions 67 into which the fitting portions 49 of the protector 40 are accommodated from above when the protector 40 is accommodated into the protector accommodating portion 66 are formed over the entire length in the vertical direction on inner walls 66A on both lateral sides of the protector accommodating portion 66. In this embodiment, as shown in FIGS. 3 and 6, two fit portions 67 corresponding to the fitting portions 49 of the protector 40 are formed while being spaced apart in the front-back direction in each inner wall 66A of the protector accommodating portion 66. The fit portion 67 is in the form of a recess formed in the inner wall 66A of the protector accommodating portion 66 and having a substantially rectangular shape in a plan view.

Accordingly, when the fitting portions 49 of the protector 40 are fit into the fit portions 67 from above, the fit portions 67 and the fitting portions 49 are fit in a concave-convex manner in the lateral direction, which is a direction intersecting an extending direction of the wiring harness 30. Further, when the fit portions 67 and the fitting portions 49 are fit in a concave-convex manner, the fit portions 67 and the fitting portions 49 are locked in the front-back direction, whereby the wiring harness unit 10 is held not to be detached from the protector accommodating portion 66 in the extending direction of the wiring harness 30.

Further, as shown in FIGS. 5 and 6, retaining holes 68 penetrating through the standing wall 64 in the lateral direction and having a substantially rectangular opening are formed in the fit portions 67 on the left inner wall 66A of the protector accommodating portion 66.

The retaining hole 68 is formed in a substantially vertically central part of the fit portion 67 to correspond to the retaining portion 44 on the fitting portion 49 of the protector 40. Accordingly, when the protector 40 is accommodated into the protector accommodating portion 66 from above and reaches a proper assembly position, the retaining portions 44 of the protector 40 are fit into the retaining holes 68. Further, when the retaining portions 44 are fit into the retaining holes 68, upper surfaces 44U of the retaining portion 44 and upper edge parts 68U of the retaining holes 68 are locked in the vertical direction, thereby preventing the protector 40 of the wiring harness unit 10 from being detached upward from the protector accommodating portion 66.

This embodiment is configured as described above. Next, functions and effects of the wiring harness unit 10 attached to the case of the device are described.

Generally, a wiring harness composed of a plurality of coated wires is configured by winding a binding band around the plurality of coated wires to bundle the coated wires. If a fastening member such as the binding band is wound around the wires, there is a concern that the fastening member bites into the coated wires to damage the coated wires if the wiring harness is strongly pulled.

Accordingly, the present inventors diligently studied to solve the above problem and, as a result, found out the configuration of this embodiment. That is, this embodiment relates to the wiring harness unit 10 to be attached to the case (attached member) 60 and including the wiring harness 30 having at least one coated wire 11 fixed to the sheet-like base members 20, the pair of sandwiching portions 50 for sandwiching and holding the margin portion 34 different from a part of the base member 20 fixed to the coated wires 11 in the base members 20, and the protector 40 including the fitting portions 49 to be fit into the fit portions 67 provided in the case 60 in the lateral direction (direction intersecting the extending direction of the coated wires 11) and locked to the fit portions 67 in the front-back direction (extending direction of the coated wires 11).

That is, according to this embodiment, the margin portion 34 different from the part fixed to the coated wires 11 is sandwiched and held by the pair of sandwiching portions 50 as shown in FIG. 11. Further, as shown in FIGS. 3 and 6, the wiring harness unit 10 is attached to the case 60 by fitting the fitting portions 49 into the fit portions 67 of the case 60. In this way, a pulling force acts on the base members 20 of the wiring harness 30 and a fastening member or the like does not bite into the coated wires, for example, if the wiring harness 30 is strongly pulled. Thus, the damage of the coated wires 11 of the wiring harness 30 by another member can be prevented.

Further, the pair of sandwiching portions 50 of this embodiment include the plurality of protrusions 54 projecting toward the margin portion 34, the plurality of protrusions 54 in one 50 of the pair of sandwiching portions 50 and the plurality of second projecting portions 54 in the other 50 of the pair of sandwiching portions 50 are alternately arranged, and the margin portion 34 is arranged to meander between the plurality of second projecting portions 54 alternately arranged.

That is, since the margin portion 34 is arranged to meander between the plurality of protrusions 54 in the pair of sandwiching portions 50, the protrusions 54 bite into the base members 20 of the margin portion 34 and the detachment of the wiring harness 30 from the protector 40 can be suppressed if the wiring harness 30 is pulled. Further, a holding force for the wiring harness 30 in the protector 40 can be enhanced.

As shown in FIG. 5, the protector 40 further includes the pair of wall bodies 42 connected to the pair of sandwiching portions 50 and arranged along the wiring harness 30, the hinges 43 for linking the pair of wall bodies 42 are provided on the upper end sides (one-end sides) of the pair of wall bodies 42, the lock mechanism 46 for holding the margin portion 34 in the state sandwiched by the pair of sandwiching portions 50 is provided over the pair of wall bodies 42 on the lower end sides (other-end sides) of the pair of wall bodies 42.

According to this configuration, since the margin portion 34 is held in the state sandwiched by the pair of sandwiching portions 50 by the lock mechanism 46, the detachment of the protector 40 from the wiring harness 30 can be suppressed.

Further, according to this embodiment, the fitting portions 49 are formed to project from the pair of wall bodies 42, the case 60 includes the protector accommodating portion (accommodating portion) 66 for accommodating the protector 40 with the margin portion 34 sandwiched by the pair of sandwiching portions 50, and the inner walls 66A of the protector accommodating portion 66 are formed with the fit portions 67 recessed in correspondence with a projection dimension of the fitting portions 49 as shown in FIGS. 3 and 6.

Accordingly, the fit portions 67 and the fitting portions 49 can be fit to mount the protector 40 on the case 60 by accommodating the protector 40 into the protector accommodating portion 66. Further, since the margin portion 34 is held sandwiched by the pair of sandwiching portions 50 by accommodating the pair of wall bodies 42 into the protector accommodating portion 66, the disengagement of the margin portion 34 from the pair of sandwiching portions 50 can be doubly suppressed together with the lock mechanism 46.

The protector 40 further includes the retaining portions 44 to be locked to the upper edge parts 68U of the retaining holes 68 in a separating direction of the protector 40 from the protector accommodating portion 66 by being fit into the retaining holes (retained portions) 68 provided in the protector accommodating portion 66 in the front-back direction (direction intersecting the extending direction of the coated wires 11) in a concave-convex manner as shown in FIG. 5.

Further, the retaining portions 44 are formed to further project on the projecting end parts of the fitting portions 49, and the retaining holes 68 are formed to penetrate through the standing wall 64 by further recessing the inner surfaces of the fit portions 67.

That is, the detachment of the pair of wall bodies 42 from the protector accommodating portion 66 can be prevented by locking the upper edge parts 68U of the retaining holes 68 and the retaining portions 44 in the vertical direction. In this way, the detachment of the wiring harness unit 10 from the protector accommodating portion 66 of the case 60 can be suppressed.

Second Embodiment

Next, a second embodiment is described with reference to FIGS. 18 to 20.

A wiring harness unit 110 of the second embodiment is obtained by changing the shape of the protector 40 in the wiring harness unit 10 of the first embodiment, and configurations, functions and effects common to the first embodiment are not described to avoid repeated description. Further, the same reference signs are used to denote the same components as those of the first embodiment.

Figure 18:
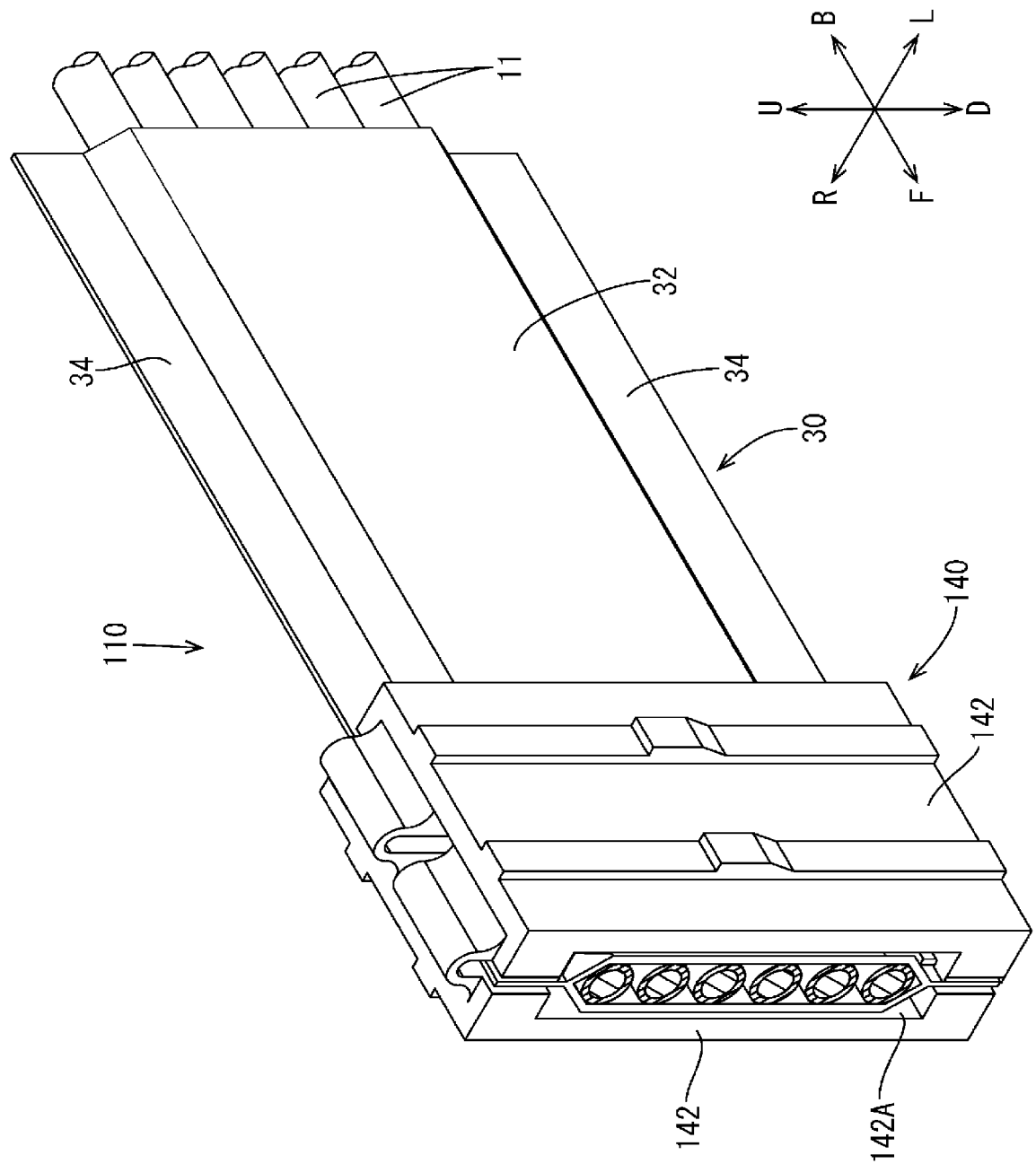
FIG. 18 is a perspective view of a wiring harness unit according to a second embodiment.
Figure 19:
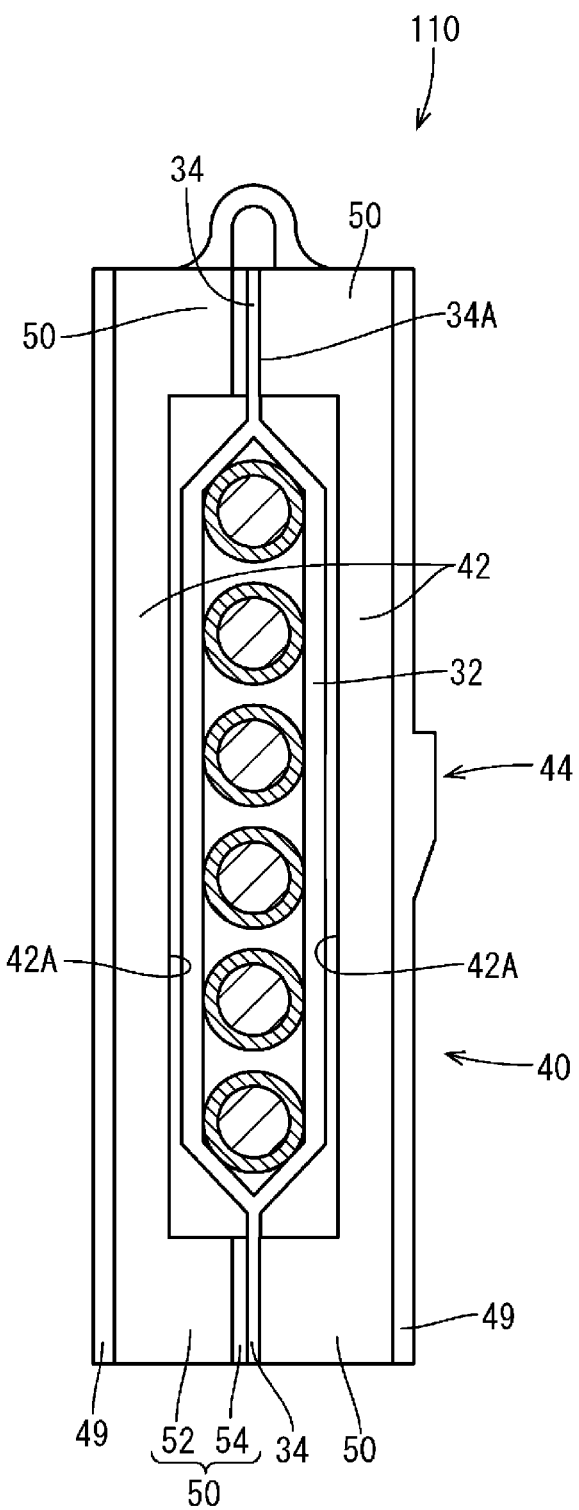
FIG. 19 is a front view of the wiring harness unit.
Figure 20:
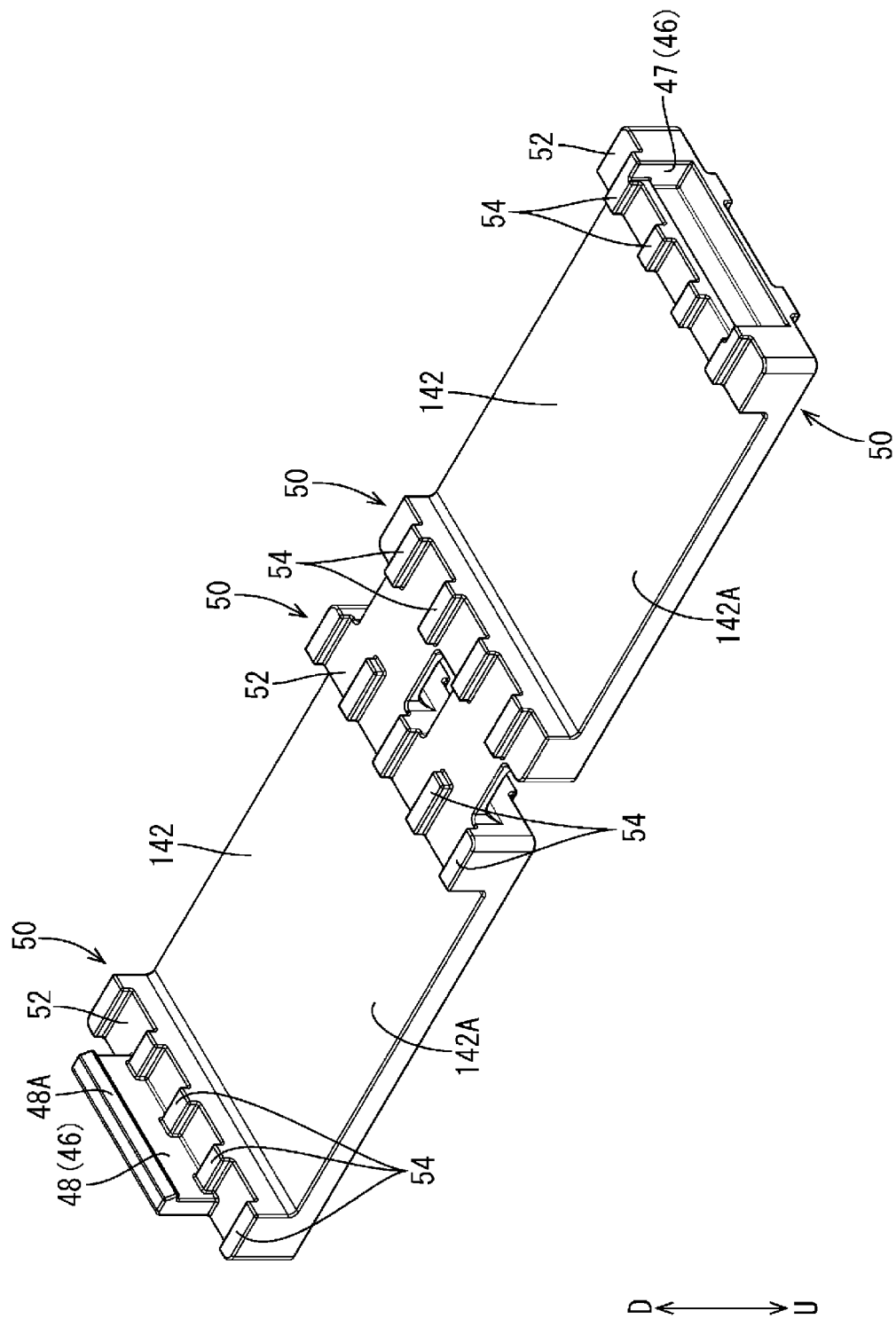
FIG. 20 is a perspective view of a protector.

A protector 140 of the second embodiment is not formed with the support protrusions 41 on the inner side surfaces 42A of the pair of wall bodies 42 in the first embodiment as shown in FIGS. 18 to 20. In other words, the protector 140 is configured such that pairs of sandwiching portions 50 on inner side surfaces 142A of a pair of wall bodies 42 are flat.

Accordingly, when the protector 140 is assembled with a wiring harness 30, margin portions 34 of the wiring harness 30 are sandwiched by the pairs of the sandwiching portions 50, but the pair of wall bodies 42 and a wire fixing portion 32 are separated in the lateral direction.

That is, since the wire fixing portion 32 of the wiring harness 30 and the protector 40 do not interact, for example, even if the wiring harness 30 is pulled backward, the damage of coated wires 11 of the wiring harness 30 by another member can be further suppressed.

Other Embodiments

The technique disclosed in this specification is not limited to the above described and illustrated embodiments and also includes, for example, the following various modes.

(1) In the above embodiments, the wiring harness 30 includes the six coated wires 11. However, without limitation to this, a wiring harness may be composed of five or less or seven or more coated wires and wire diameters of the coated wires may be arbitrarily changed.

(2) In the above embodiments, the wiring harness 30 is configured such that the plurality of wires 11 are sandwiched by the pair of base members 20. However, without limitation to this, a wiring harness may be configured such that a plurality of wires are fixed to one surface of one base member.

(3) In the above embodiments, the wiring harness unit 10 is fixed to the case 60 by accommodating the protector 40 into the protector accommodating portion 66 of the case 60. However, without limitation to this, a fitting portion of a clip may be formed on an outer side surface of a protector and a wiring harness unit may be fixed to a case by fitting the fitting portion into a fit portion in the form of a round hole provided in the case.

(4) In the above embodiments, the lock mechanism 46 is formed on the pair of sandwiching portions 50 on the lower side in the protector 40. However, without limitation to this, a lock mechanism may be formed on a front or back part of a protector. Further, a pair of wall bodies may not be formed with a lock mechanism if a worker assembles a wiring harness unit with a case while holding a protector assembled with the wiring harness.

LIST OF REFERENCE NUMERALS

10: wiring harness unit
11: coated wire (example of "wire")
20: base member
30: wiring harness
34: margin portion
40: protector
42: wall body
43: hinge
44: retaining portion
46: lock mechanism
49: fitting portion
50: sandwiching portion
54: protrusion
60: case (example of "attached member")
66: protector accommodating portion (example of "accommodating portion")
66A: inner wall
67: fit portion
68: retaining hole (example of "retained portion")

What is claimed is:
1. A wiring harness mounting structure comprising:
a wiring harness unit; and
an attached member configured to be attached to the wiring harness unit,
wherein the wiring harness unit includes a wiring harness having at least one wire fixed to a sheet-like base member, a margin portion formed by sides of the base member, and a protector including a pair of wall bodies arranged along the wiring harness, a pair of sandwiching portions formed on edge parts of inner side surfaces of the wall bodies for sandwiching and holding the margin portion, and fitting portions formed on outer surfaces of the pair of wall bodies, the fitting portions projecting outward from the outer surfaces and configured to be fit to fit portions provided on the attached member in a direction intersecting an extending direction of the wire and locked to the fit portions in the extending direction of the wire, the attached member includes an accommodating portion for accommodating the protector with the margin portion sandwiched by the pair of sandwiching portions, the fit portions are shaped in correspondence with a projection dimension of the fitting portions and are formed as recesses in an inner wall of the accommodating portion, and the protector further includes a retaining portion to be locked to a retained portion in a separating direction of the protector from the accommodating portion by being fit to the retained portion provided on the accommodating portion in a concave-convex manner in a direction intersecting the extending direction of the wire.

2. The wiring harness mounting structure of claim 1, wherein:

the pair of sandwiching portions include a plurality of protrusions projecting toward the margin portion, the plurality of protrusions in one of the pair of sandwiching portions and the plurality of protrusions in the other of the pair of sandwiching portions are alternately arranged, and the margin portion is arranged to meander between the plurality of protrusions alternately arranged.

3. The wiring harness mounting structure of claim 1, wherein:

a hinge for linking the pair of wall bodies to each other is provided on one-end sides of the pair of wall bodies, and a lock for holding the margin portion in a state sandwiched by the pair of sandwiching portions is provided over the pair of wall bodies on other-end sides of the pair of wall bodies.

4. The wiring harness mounting structure of claim 1, wherein:

the retaining portions are formed to project further outward from projecting end parts of the fitting portions, and the retained portions are formed by further recessing inner surfaces of the fit portions.

\* \* \* \* \*